United States Patent [19]

Sweeney

[11] Patent Number: 5,728,458
[45] Date of Patent: Mar. 17, 1998

[54] LIGHT-WEIGHT HIGH-STRENGTH COMPOSITE PAD

[75] Inventor: Jeff S. Sweeney, Atlanta, Ga.

[73] Assignee: DiversiTech Corporation, Decatur, Ga.

[21] Appl. No.: 697,013

[22] Filed: Aug. 16, 1996

Related U.S. Application Data

[63] Continuation of Ser. No. 416,198, Apr. 4, 1995, abandoned.

[51] Int. Cl.$^6$ .................................................. B32B 5/22
[52] U.S. Cl. ........................... 428/312.4; 428/70; 428/71; 428/76
[58] Field of Search ..................... 428/312.4, 70, 71, 428/76

[56] References Cited

U.S. PATENT DOCUMENTS

| | | |
|---|---|---|
| 3,509,010 | 4/1970 | Metzger . |
| 3,745,058 | 7/1973 | Paymal . |
| 4,050,659 | 9/1977 | McCannon et al. ............... 248/19 |
| 4,303,722 | 12/1981 | Pilgrim ........................... 428/213 |
| 4,306,395 | 12/1981 | Carpenter ........................ 52/223 |
| 4,351,867 | 9/1982 | Mulvey et al. .................. 428/70 |
| 4,441,944 | 4/1984 | Massey ............................ 156/71 |
| 4,505,449 | 3/1985 | Turner et al. ................... 248/669 |
| 4,559,263 | 12/1985 | Roodvoets ...................... 428/312.4 |
| 4,617,219 | 10/1986 | Shupack .......................... 428/113 |
| 4,636,425 | 1/1987 | Johnson et al. ................. 428/198 |
| 4,743,624 | 5/1988 | Blount ............................. 521/106 |
| 4,764,238 | 8/1988 | Dastin et al. ................... 156/245 |
| 4,778,718 | 10/1988 | Nicholls .......................... 428/287 |
| 4,816,091 | 3/1989 | Miller ............................. 156/42 |
| 4,963,408 | 10/1990 | Huegli ............................. 428/71 |
| 5,162,060 | 11/1992 | Bredow et al. ................. 106/808 |
| 5,268,226 | 12/1993 | Sweeney ........................ 428/312.4 |

FOREIGN PATENT DOCUMENTS

| | | |
|---|---|---|
| 941023 | 11/1963 | United Kingdom . |
| 1058396 | 2/1967 | United Kingdom . |
| 2136468 | 9/1984 | United Kingdom . |

OTHER PUBLICATIONS

Rigid Foam Laminates by M.G. Halpern Noyes Data Corporation N.J. 1972 pp. 156–157.

U.S. Application No. 08/130,424, Sweeney, filed. Oct. 1, 1996.

*Primary Examiner*—Kathleen Choi
*Attorney, Agent, or Firm*—Jones & Askew

[57] ABSTRACT

The present invention relates to a low-weight, high-strength composite pad, and a method of making the same. The composite pad has a substantially rigid board and at least one reinforcing coating on one or more sides of the board. The reinforcing coating has a foamable material with a fibrous fabric bonded thereto. At least one layer of a slurry mixture then covers the reinforcing coating. Also generally described, the method of making the present invention involves forming in a mold a reinforced core of the substantially rigid board, the foamable material, and the fibrous fabric, removing the reinforced core from the mold, and then applying the layer of slurry mixture thereto.

20 Claims, 2 Drawing Sheets

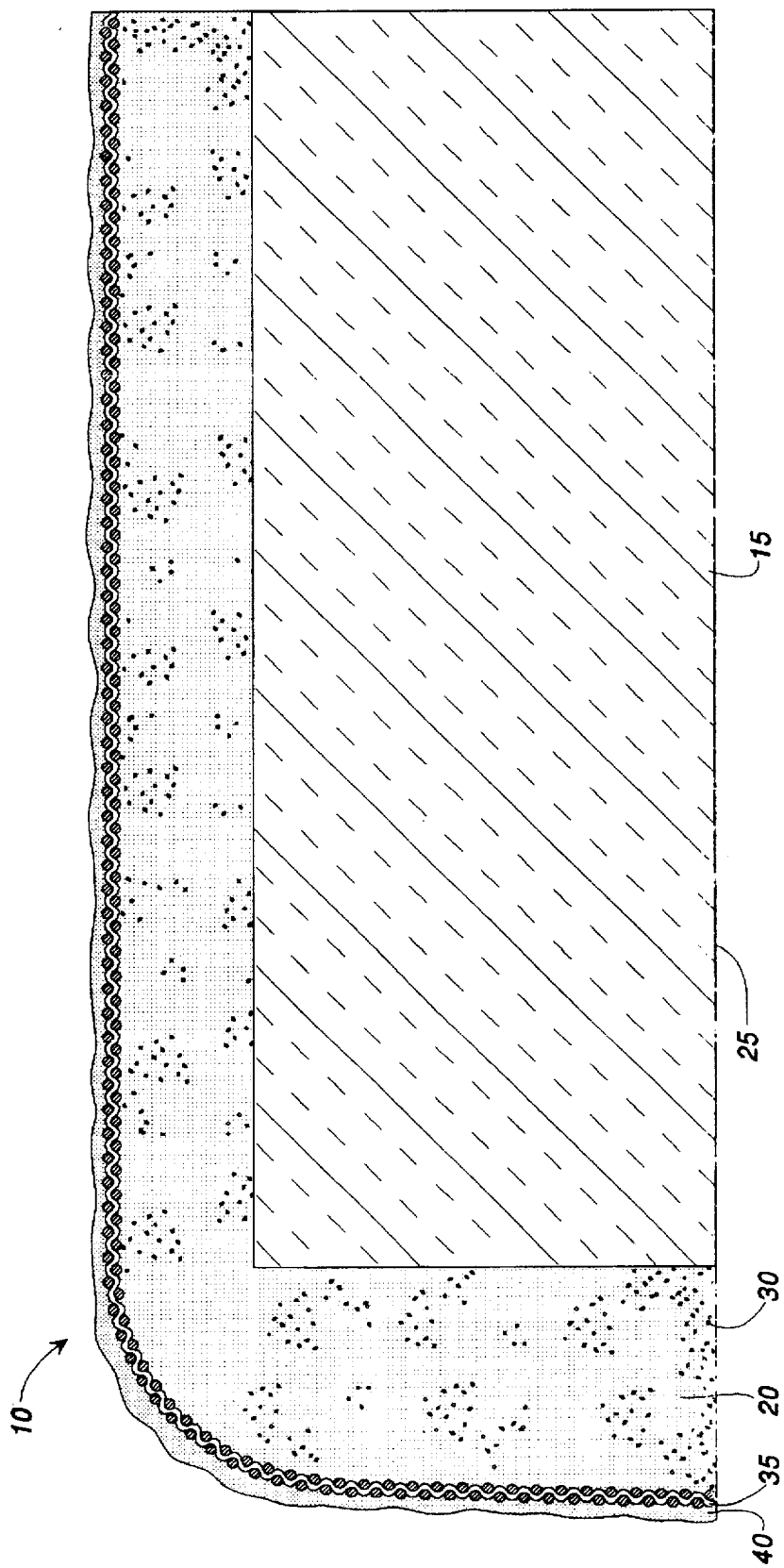

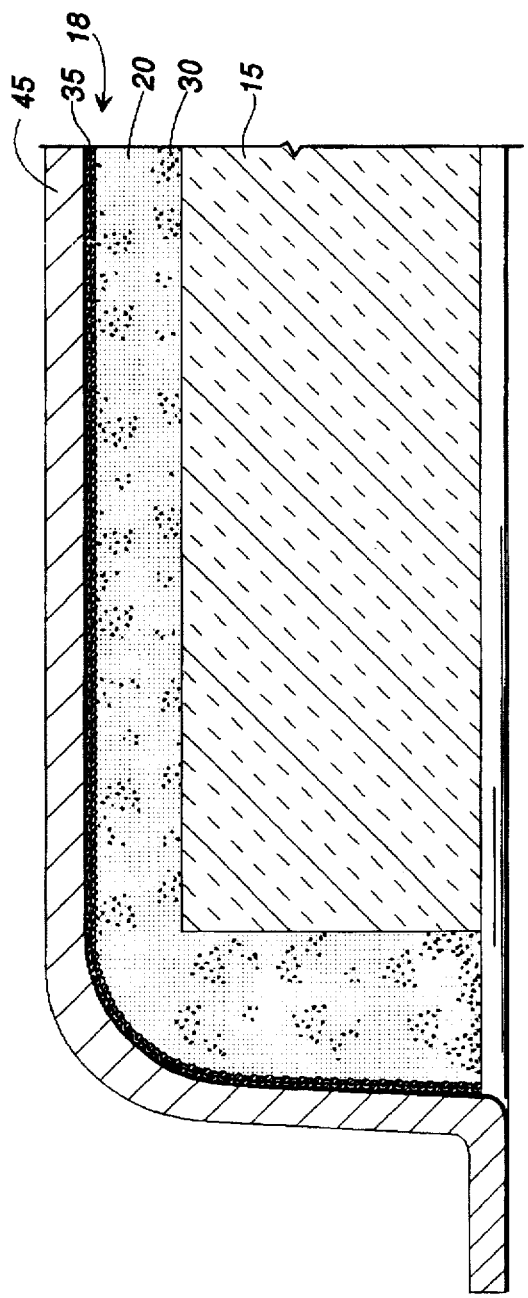
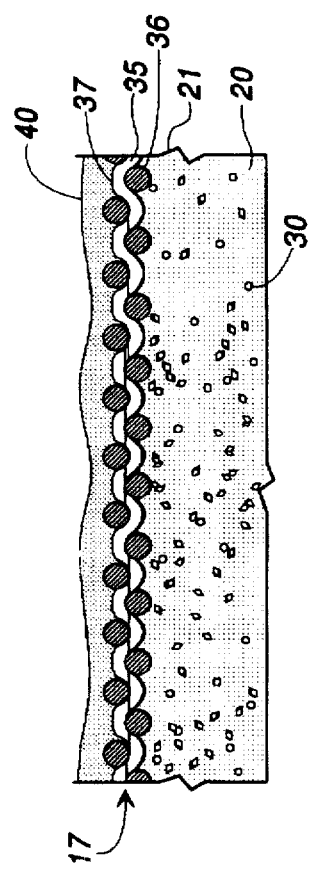

LIGHT-WEIGHT HIGH-STRENGTH COMPOSITE PAD

This is a continuation of application Ser. No. 08/416,198 filed Apr. 4, 1995, now abandoned.

TECHNICAL FIELD

The present invention relates generally to composite materials and a method of making the same and more particularly to a light-weight high-strength composite structure for use as an equipment pad, a building panel, and other applications.

BACKGROUND OF THE INVENTION

Numerous types of composite materials have been employed in the past to replace concrete in structures such as equipment pads, building panels, and other applications requiring a high amount of strength and durability. These composite materials are preferred because they are light-weight and can support the same or even greater loads as compared to concrete. Further, while concrete equipment pads and other structures must be poured at the construction site, structures made from composite materials can be easily transported and erected with little site preparation.

An example of such an equipment pad made from a composite material is found in commonly owned U.S. Pat. No. 4,505,449, entitled "Lightweight Concrete Cladded Heavy Equipment Base." The preferred embodiment of this invention comprises a polystyrene foam core covered on five sides with a fiberglass and cement composition. The resultant pad is from 1/8th to 1/16th the weight of an ordinary concrete base, but with sufficient load strength to act as a heavy equipment pad. U.S. Pat. No. 4,505,449 is incorporated hereto by reference.

Other commonly owned inventions have employed various types of composite materials. For example, one method uses a foam board covered on one or more of its sides with a high strength outer layer comprising a non-woven web impregnated with a cementitious slurry binder. This outer layer is largely crack resistance with greater ductility and toughness than ordinary cement or concrete. The pad is made by placing the foam board in a mold, surrounding the board with the cementitious slurry and impressing the non-woven web into the slurry. Pressure is then applied to the outer layer while the materials are cured. Approximately 24 hours are required for the materials to cure in the mold. A thirty inch by thirty inch by two inch pad made from this method has an approximate concentrated load strength of 300 pounds per square inch and flexural strength of approximately 350 pounds in a mid span loading test.

As the acceptance and use of structures made from composite materials has increased, there has been a constant demand on manufacturers to produce such structures with ever increasing load strength and flexibility and ever decreasing gross weight and costs. In order to accomplish these goals, there is a recognized need to decrease the number of materials used to create the composite materials while maintaining the strength and weight of the structure. There is also a need to accelerate the time required for the manufacturing process or a means to make the process more efficient.

SUMMARY OF THE INVENTION

Generally described, the present invention relates to a low-weight, high-strength composite material, and a method of making the same. The composite material has a reinforced core comprising a rigid board and at least one reinforcing coating on one or more sides of the board. The reinforcing coating comprises a foamable material with a fibrous fabric bonded thereto. At least one layer of a slurry mixture then covers the reinforcing coating. Also generally described, the method of making the present invention involves forming the reinforced core in a mold, removing the reinforced core from the mold and then coating the reinforced core with an outer layer of the slurry mixture. The reinforced core is formed in the mold by first placing a reinforcing fabric in the mold, injecting a foamable material into the mold and then pressing a rigid foam board into the foamable material. After a short time, the reinforced core is removed from the mold and then coated with the outer layer of slurry mixture.

In a preferred embodiment, the composite material is used to manufacture a composite pad. The composite pad has an expanded polystyrene board covered on five sides with a layer of a polyurethane foam material. The polyurethane foam may include a filler material such as sand for bulk and strength. The outer surface of the polyurethane foam is reinforced with a needle punched non-woven fabric. This fabric is bonded to and partially impregnated by the upper surface of the polyurethane foam to create the reinforcing coating for the reinforced core. This reinforced core is then covered with an outer layer of cementitious slurry. The cementitious slurry bonds to the reinforcing coating of the reinforced core by partially impregnating the fibrous fabric on the outer surface of the polyurethane foam.

The preferred method of making the subject invention involves first making the reinforced core by lining a mold with the fibrous fabric, injecting the foamable material, and placing the rigid board into the mold. The foamable material will expand and cure in the mold in approximately four minutes. The reinforced core may then be removed from the mold and the outer layer of the slurry mixture applied via spraying, screeding, rolling, or other methods. The cementitious slurry may then be surface treated to achieve the desired texture or color.

A composite pad made according to the present invention has substantial advantages over those known in the art. The invention results in a structure that can support over 325 pounds per square inch of concentrated load and over 400 pounds in flexural strength. The composite pad, however, weighs only 1/12th of its solid concrete counterpart. Significantly, the method of the subject invention requires far less mold time than standard methods. Rather than adding the cementitious slurry to the reinforced core while in the mold and requiring hours or days for the finished product to cure, the present invention only forms the reinforced core in the mold and then later adds the slurry mixture once the reinforced core has been removed from the mold. The reinforced core can be formed in any type of mold in minutes, thereby significantly increasing the availability and repeat use of the molds. Further, applying the slurry mixture to the reinforced core outside of the mold allows for easier and more consistent control of the surface finishing process.

The subject invention is therefore efficient and flexible. A high degree of efficiency is achieved by separating the forming/molding or shaping process of the reinforced core from the final coating process. The amount of raw materials is reduced by using the same fibrous fabric as a reinforcing material for the reinforced core and for the outer layer. By forming the reinforcing coating integrally with the foamable material, the invention eliminates a separate step of applying reinforcement to either the reinforced core or the outer layer. Flexibility is achieved through the use of numerous types of rigid boards, foamable materials, fillers, fibrous fabric reinforcement, and outer layers within the same basic process to produce end products with a wide array of uses.

Therefore, it is an object of the present invention to provide a high-strength, low-weight composite material and a method of making the same.

It is a further object of the present invention to provide a structure made from composite materials with significantly less weight and equal if not greater strength as compared to concrete structures of similar dimensions.

It is a further object of the present invention to provide an improved composite material for use as a heavy equipment pad, building panels, or other structures requiring significant load strength and durability.

It is a further object of the present invention to provide an improved method of making composite material structures with fewer materials and in less time.

It is a further object of the present invention to provide a method of making composite material structures in which the forming/molding or shaping steps are separated from the surface coating steps so as to decrease greatly the amount of mold time required.

It is a further object of the present invention to provide an improved composite material structure comprising a reinforced core, which is constructed from a rigid board and a high strength reinforcing coating comprised of a foamable material and a fabric, and an outer surface layer.

Other objects, features, and advantages of the present invention will become apparent upon reading the following detailed description of the preferred embodiment of the invention, when taken in conjunction with the drawings and appended claims.

BRIEF DESCRIPTION OF THE DRAWINGS

FIG. 1 is a perspective view of the major components of the composite material of the present invention.

FIG. 2 is a cross-sectional view illustrating the specific arrangement of the reinforced core while in the mold.

FIG. 3 is a cross-sectional view of the fibrous fabric impregnated by the foamable core material and the cementitious slurry.

DETAILED DESCRIPTION OF THE INVENTION

Referring to the drawings, in which like numerals represent like parts throughout the several views, FIGS. 1 through 3 show the preferred embodiment of a composite material structure, an equipment pad 10. The equipment pad 10 comprises a substantially rigid board 15 constructed from expanded polystyrene or any rigid material such as wood, paper, plastic, metal, or sheet rock. The board can be formed in any type of outer shape depending upon the shape of the desired end product, while the interior can be a solid form or a honeycomb or similar configuration. While the use of the rigid board 15 is preferred because of the stability the board 15 adds to the end product such as the equipment pad 10, there may be applications in which the rigid board 15 may be omitted or substantially reduced in size.

The substantially rigid board 15 is covered with a foamable material 20 of polyurethane, polyisocyanurate, expanded polystyrene, or other substantially rigid foams. The foamable material 20 also may contain a filler 30 such as a mixture of moderately coarse sand to add bulk and strength. Plastic, gravel, or ground waste material also may be used.

In the preferred embodiment, the foamable material 20 is placed on five sides of the rigid board 15 such that a bottom surface 25 of the rigid board 15 is left exposed. The exposure of the bottom surface 25 allows for easier installation of the equipment pad 10 at the construction site because the expanded polystyrene or other rigid board 15 will easily conform to the ground configuration. Further, by leaving the bottom surface 25 exposed, the equipment pads 10 can be easily stacked during manufacture and distribution without fear of damaging the surface of the adjacent equipment pad 10.

The foamable material 20 is reinforced with a fibrous fabric 35 to add strength and durability. A bottom surface 36 of the fibrous fabric 35 is bonded to and partially impregnates an outer surface 21 of the foamable material 20 to form a reinforcing coating 17 around the rigid core 15. At this point, the rigid board 15 with the reinforcing coating 17 thereon is referred to as a reinforced core 18. The fibrous fabric 35 is preferably a needle-punched polypropylene non-woven such as a three dimensional web of lofty, discrete polypropylene fibers with a fiber volume of approximately 3 to 20 percent. The fibrous fabric 35, however, can be any type of synthetic or natural fibrous material, including spunbonded fabrics, mesh, glass mats, or even paper.

An outer layer 40 of a slurry mixture is then applied to the reinforcing coating 17 of the reinforced core 18. The slurry mixture 40 bonds to and impregnates an upper surface 37 of the fibrous fabric 35 of the reinforcing coating 17. The fibrous fabric 35 therefore acts as a durable interface between the foamable material 20 and the slurry mixture 40. When cured, the outer layer of the slurry mixture 40 provides the pad 10 with a hardened outer surface appropriate for the desired end use. The slurry mixture 40 is preferably a cementitious mixture, but can include mixtures of concrete, plaster, epoxy, synthetic resins, polymers, paint, or water proofing compounds, depending upon the requirements of the end use. Any type of known cementitious slurry can be used, including a mixture of 10 parts Portland cement, 1 part microsilica, 5 parts fine sand, 4 parts water, and 0.1 parts water reducing superplasticizer.

The preferred method of making the subject invention comprises first creating the reinforced core 18 in a mold 45 by lining the mold 45 with the fibrous fabric 35, spraying or injecting the foamable material 20 into the mold 45 and onto the fabric 35, and positioning the rigid board 15 (if desired) therein. The molding process with foamable material 20 is one of low pressure, i.e., 2 to 10 pounds per square inch, and can be accomplished in steel, aluminum, or even wooden molds 45. The foamable material 20 consistently self-seeks the shape of the mold 45, thereby pushing the reinforcing coating 17 to the outer surface of the molded shape. The foamable material 20 of polyurethane foam expands and cures in approximately four minutes. The reinforced core 18 can be individually molded in any form for the desired end use, such as in the case of the equipment pad 10.

After the reinforced core 18 has cured, the reinforced core 18 can removed from the mold 45, allowing the mold 45 to be reused almost immediately. The slurry mixture 40 is applied at any convenient time to the outside of the reinforced core 18. By applying the slurry mixture 40 outside of the mold 45, the surface finishing process can be readily observed and controlled to ensure a uniform finish. The slurry mixture 40 is applied onto the upper surface 37 of the fibrous fabric 35 of the reinforced core 18 by hand rubbing, rolling, dripping, screeding, spraying, or other known methods. Further, a masonry paint or a modified slurry mixture 40 can be applied over the slurry soaked reinforced core 18 to achieve the desired texture, color, or aesthetic uniformity. Depending upon the desired thickness, the slurry mixture 40 generally hardens or cures in approximately 24 hours.

The reinforced core 18 also can be manufactured in a continuous molding process. A continuously molded reinforced core 18 can be cast or laminated by unwinding a strip of the fibrous fabric 35 in a continuous mold 45 by known methods, spraying or dispensing the foamable core material 20 on top of the fibrous fabric 35 as discussed above, adding filler 30 such as sand and the rigid board 15 (as desired), curing the reinforced core 18 in the mold 45 for the required time, and cutting the reinforced core 18 into panels or pads 10 with a flying-type cut-off saw (not shown). The reinforced core 18 can be coated with the slurry mixture 40 on a continuous line either before or after the saw is operated. The slurry mixture 40 can be applied to the continuous core 18 by spraying, screeding, rolling, or the other methods described above.

An example of an equipment pad 10 manufactured according to the preferred embodiment of this invention employs the use of a 1½ inch thick rigid board 15 made of expanded polystyrene in the range of 1 to 2 pounds per cubic foot. The rigid board 15 is then covered on five sides with ½ inch of the foamable material 20 of polyurethane foam in the range of 2 to 4 pounds per cubic foot with 0.6 pounds per square foot of filler 30 of sand. The foamable material 20 is impregnated into the fibrous fabric 35 of an 8 ounce per square yard, needle-punched, polypropylene non-woven with ¼ inch loft or thickness.

By itself, the polyurethane foamable material 20 has a flexural strength of 30 to 100 pounds, i.e., the foamable material 20 fails at mid-span under loads of 30 to 100 pounds when supported only at its two ends. By adding the fibrous fabric 35 to the foamable material 20 surrounding the rigid core 15, a 30 inch by 30 inch by 2 inch reinforced core 18 requires from 200 to 350 pounds to fail under the same loading conditions. Further, the reinforced core 18 can support concentrated loads of at least 125 to 200 pounds per square inch. This load strength is two to four times stronger than the strength of the foamable core material 20 itself.

The slurry mixture 40 is then applied to the reinforced core 18. A layer of 1½ pounds per square foot of the slurry mixture 40 results in an equipment pad 10 that can support over 325 pounds per square inch of concentrated load and requires over 400 pounds per square inch of flexural load to fail in the mid-span test described above. The weight of such an equipment pad 10, however, is only 1/12th to 1/16th of a solid concrete counterpart.

In addition to equipment pads 10, other types of structures may be constructed according to the present invention. For example, building panels may be constructed according to the present invention with various finishing layers such as masonry paint added to the slurry mixture 40 or applied on top of the slurry mixture 40. The subject invention also can be employed as a stucco substrate in other construction applications. Preferably, a reinforced core 18 of approximately 1 inch is reinforced and impregnated with a slurry mixture 40 with a flat trowel to create a nailable panel ready for a stucco finish coat. Depending upon the types of materials used, a high strength, low weight building panel constructed according to the present invention can provide thermal insulation, noise reduction, fire resistance, and water proofing.

Other embodiments of the invention include structures used as panels in clean rooms or chemical rooms wherein the slurry mixture 40 is an epoxy resin or polymer coating for the desired properties. Further, the invention can be modified for use as a floating dock by using large billets of expanded polystyrene as the rigid board 15 to provide buoyancy.

While this invention has been described in specific detail with reference to the disclosed embodiments, it will be understood that many variations and modifications may be affected within the spirit and scope of the invention as described in the appended claims.

I claim:

1. A low-weight, high-strength composite material support pad, comprising:

a substantially rigid board;

at least one reinforcing coating covering one or more sides of said substantially rigid board;

said reinforcing coating comprising a substantially rigid foam with a fibrous fabric bonded to said substantially rigid foam; and at least one layer of a slurry mixture covering said reinforcing coating.

2. The support pad of claim 1 wherein said substantially rigid board comprises expanded polystyrene.

3. The support pad of claim 1 wherein said foamable material further comprises filler material.

4. The support pad of claim 1 wherein said foamable material comprises polyurethane foam.

5. The support pad of claim 1 wherein said fibrous fabric comprises a needle-punched, polypropylene non-woven web.

6. The support pad of claim 1 wherein said slurry mixture comprises a cementitious slurry.

7. The support pad of claim 1 wherein said slurry mixture comprises epoxy resins.

8. The support pad of claim 1 wherein a lower surface of said fibrous fabric is partially impregnated by said foamable material.

9. The support pad of claim 1 wherein an upper surface of said fibrous fabric is partially impregnated by said slurry mixture.

10. The support pad of claim 1 wherein said fibrous fabric acts as an interface between said foamable material and said slurry mixture.

11. The support pad of claim 1 wherein said material is adapted for use as a heavy equipment pad.

12. The support pad of claim 1 wherein said material is adapted for use as a building panel.

13. The support pad of claim 1 wherein said material weighs from 1/12th to 1/16th of the weight of a solid concrete counterpart.

14. The support pad of claim 1 wherein said material can support loads of over 325 pounds per square inch without failing.

15. The support pad of claim 1 wherein said substantially rigid board is covered on five sides by said reinforcing coating.

16. The reinforced composite structure of claim 1 wherein said substantially rigid board is bonded to said foamable material.

17. The support pad of claim 1 wherein said foamable material further comprises sand.

18. A support pad, comprising:

a substantially rigid board;

a substantially rigid foam covering one or more sides of said substantially rigid board;

a fibrous fabric with a first and second side;

said substantially rigid foam impregnating said first side of said fibrous fabric;

at least one layer of a slurry mixture; and said slurry mixture impregnating said second side of said fibrous fabric.

19. The support pad of claim 1, wherein said substantially rigid foam comprises a density of 2 to 4 pounds per cubic foot.

20. The support pad of claim 18, wherein said substantially rigid foam comprises a density of 2 to 4 pounds per cubic foot.

* * * * *